(12) United States Patent
Zhu et al.

(10) Patent No.: US 9,631,051 B2
(45) Date of Patent: Apr. 25, 2017

(54) DEVICE FOR THE SYNTHESIS OF A POLYMER WITH EXTRACTION OF A GASEOUS SUBSTANCE COMPRISING A REACTION CHAMBER HAVING AT LEAST ONE CIRCULAR-CYLINDRICAL SECTION

(71) Applicant: BASF SE, Ludwigshafen (DE)

(72) Inventors: Ning Zhu, Mannheim (DE); Achim Stammer, Freinsheim (DE); Joachim Clauss, Darmstadt (DE); Gad Kory, Gaiberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/896,769

(22) PCT Filed: Jun. 11, 2014

(86) PCT No.: PCT/EP2014/062121
§ 371 (c)(1),
(2) Date: Dec. 8, 2015

(87) PCT Pub. No.: WO2014/198767
PCT Pub. Date: Dec. 18, 2014

(65) Prior Publication Data
US 2016/0200870 A1    Jul. 14, 2016

(30) Foreign Application Priority Data

Jun. 12, 2013  (EP) .................................. 13171655

(51) Int. Cl.
| | | |
|---|---|---|
| *C08G 69/28* | (2006.01) | |
| *C08G 69/46* | (2006.01) | |
| *B01J 19/00* | (2006.01) | |
| *C08G 69/26* | (2006.01) | |
| *B01J 19/18* | (2006.01) | |
| *C08F 2/00* | (2006.01) | |
| *C08L 77/06* | (2006.01) | |
| *C08G 63/88* | (2006.01) | |

(52) U.S. Cl.
CPC .......... *C08G 69/46* (2013.01); *B01J 19/0026* (2013.01); *B01J 19/0066* (2013.01); *B01J 19/1887* (2013.01); *C08F 2/002* (2013.01); *C08F 2/005* (2013.01); *C08G 69/265* (2013.01); *C08G 69/28* (2013.01); *C08L 77/06* (2013.01); *B01J 2219/00094* (2013.01); *B01J 2219/00247* (2013.01); *B01J 2219/182* (2013.01); *B01J 2219/1948* (2013.01); *C08G 63/88* (2013.01)

(58) Field of Classification Search
CPC ...... B01J 2219/0086; B01J 2219/00873; B01J 2219/00889; C08G 63/88; C08G 69/28; C08G 69/46
See application file for complete search history.

(56) References Cited

U.S. PATENT DOCUMENTS

| 2,993,842 | A | 7/1961 | Smith |
| 4,138,544 | A | 2/1979 | Janssen et al. |
| 2014/0148561 | A1* | 5/2014 | Paul et al. ........... B01J 19/1812 526/64 |

FOREIGN PATENT DOCUMENTS

| DE | 10 2006 047 942 B3 | | 1/2008 |
| DE | EP 2471594 | * | 7/2012 |
| EP | 0 267 025 A1 | | 5/1988 |
| EP | 0267025 | * | 5/1988 |
| EP | 2 471 594 A1 | | 7/2012 |
| FR | 2335552 A1 | | 7/1977 |

OTHER PUBLICATIONS

Alewelt, W., et al., "Industrial Thermoplastics: Polyamide," *Plastics Handbook*, 3/4, Carl Hanser Publishing Company, 1998, Munich, pp. 42-71.
U.S. Appl. No. 13/588,446, filed Aug. 17, 2012.
International Patent Application No. PCT/EP2012/066157, filed Aug. 20, 2012.
International Patent Application No. PCT/EP2013/068075, filed Sep. 2, 2013.
U.S. Appl. No. 14/016,520, filed Sep. 3, 2013.
International Patent Application No. PCT/EP2014/054324, filed Mar. 6, 2014.
U.S. Appl. No. 14/199,436, filed Mar. 6, 2014.
International Patent Application No. PCT/EP2014/054325, filed Mar. 6, 2014.
International Patent Application No. PCT/EP2014/058797, filed Apr. 30, 2014.

(Continued)

*Primary Examiner* — Gregory Listvoyb
(74) *Attorney, Agent, or Firm* — Marshall, Gerstein & Borun LLP

(57) ABSTRACT

An apparatus for synthesis of a polymer with separation of a gaseous substance comprises a reaction space having an essentially circular cylindrical upper section which is bounded by two circular faces and one shell face and has a longitudinal cylinder axis, and a lower section, an inlet orifice disposed in a circular face or the shell face of the upper section, a first outlet orifice disposed in a wall of the lower section, a second outlet orifice disposed in the shell face of the upper section opposite the first outlet orifice, and a removal device which is disposed so as to be rotatable about the longitudinal cylinder axis and is in contact with both circular faces and the shell face. This apparatus can especially be used for performance of a process including the feeding of an oligomer melt into a reaction space through an inlet orifice, the polymerization of the oligomer melt to give a polymer melt, the removal of the polymer melt from the reaction space through a first outlet orifice of the reaction space, and the removal of a gaseous substance from the reaction space through a second outlet orifice of the reaction space, wherein deposits on at least one inner wall of the reaction space are removed by a removal device and transported into the oligomer melt.

8 Claims, 2 Drawing Sheets

(56) References Cited

OTHER PUBLICATIONS

International Patent Application No. PCT/EP2014/062101, filed Jun. 11, 2014.
International Patent Application No. PCT/EP2014/062102, filed Jun. 11, 2014.
International Patent Application No. PCT/EP2014/062103, filed Jun. 11, 2014.
International Patent Application No. PCT/EP2014/062105, filed Jun. 11, 2014.
International Patent Application No. PCT/EP2014/062114, filed Jun. 11, 2014.
International Patent Application No. PCT/EP2014/062116, filed Jun. 11, 2014.
International Patent Application No. PCT/EP2014/062119, filed Jun. 11, 2014.
International Patent Application No. PCT/EP2014/062122, filed Jun. 11, 2014.
International Patent Application No. PCT/EP2014/062124, filed Jun. 11, 2014.

* cited by examiner

DEVICE FOR THE SYNTHESIS OF A POLYMER WITH EXTRACTION OF A GASEOUS SUBSTANCE COMPRISING A REACTION CHAMBER HAVING AT LEAST ONE CIRCULAR-CYLINDRICAL SECTION

CROSS-REFERENCE TO RELATED APPLICATION

This is the U.S. national phase of International Application No. PCT/EP2014/062121, filed Jun. 11, 2014, which claims the benefit of European Patent application No. 13171655.7, filed Jun. 12, 2013.

BACKGROUND OF THE INVENTION

The present invention relates to an apparatus for synthesis of a polymer, especially of a polyamide, with separation of a gaseous substance, especially of water. The present invention further relates to a process for synthesizing a polymer, especially a polyamide, with separation of a gaseous substance, especially of water, which can especially be performed using the inventive apparatus.

STATE OF THE ART

A multitude of industrial polymers are prepared by a polycondensation in which the increase in molecular weight is accompanied by the release of a low molecular weight component, which generally has to be at least partly removed from the reaction mixture, for example in order to attain the desired molecular weight and/or the desired product properties.

An important class of polycondensation polymers is that of the polyamides. As well as the main fields of use in films, fibers and materials, they serve for a multitude of further end uses. Among the polyamides, polyamide-6 (polycaprolactam) and polyamide-6,6 (Nylon, polyhexamethyleneadipamide) are the polymers prepared in the largest volumes. Polyamide-6,6 is prepared predominantly by polycondensation of what are called AH salt solutions, i.e. of aqueous solutions comprising adipic acid and 1,6-diaminohexane (hexamethylenediamine) in stoichiometric amounts. The conventional process for preparing polyamide-6 is the hydrolytic ring-opening polymerization of ε-caprolactam, which is still of very great industrial significance. Conventional preparation processes for polyamide-6 and polyamide-6,6 are described, for example, in Kunststoffhandbuch, ¾ Technische Thermoplaste: Polyamide [Plastics Handbook, ¾ Industrial Thermoplastics: Polyamides], Carl Hanser Verlag, 1998, Munich, p. 42-71.

A specific class of industrial polymers which have found wide use is that of semicrystalline or amorphous thermoplastic semiaromatic polyamides, which are notable especially for their high thermal stability and are therefore also referred to as high-temperature polyamides (HTPAs).

Specifically in the synthesis of high-temperature polyamides, it is necessary to remove water from the reaction melt. Thus, the preparation of these HTPAs generally begins with the formation of an aqueous salt solution from at least one diamine and at least one dicarboxylic acid, and optionally further monomer components, such as lactams, ω-amino acids, monoamines, monocarboxylic acids and mixtures thereof, with the proviso that at least one of the components has an aromatic group. The formation of the salt solution is then generally followed by an oligomerization in the liquid phase, during which there is generally still no removal of water. At the end of this oligomerization, the oligomers have an average, for example, of 4 to 10 repeat units at a conversion of about 70 to 80%. To increase the molecular weight further, two alternative routes are then available. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. There is a particular need for suitable apparatuses and processes for performing this melt condensation.

It is known, for example, that a prepolymer melt comprising water can be reacted in a reactor at a temperature of about 350° C. and a pressure in the range from 10 to 20 bar. In the course of this, however, deposits occur on the inner walls of the reactor above the liquid phase. This leads to a deterioration in product quality.

FR 2335552 A1 describes a process and an apparatus for the preparation of polycondensates.

EP 2471594 A1 describes a reactor comprising an essentially tubular reactor housing and a process for continuous polymerization.

EP 0267025 A1 describes a thin-film evaporator for high-viscosity fluids having a treatment chamber surrounded by a heating or cooling jacket and is equipped with a coaxial rotor.

U.S. Pat. No. 2,993,842 A describes an apparatus for the distillation of liquids and a process for the fractional distillation of liquids.

DE 102006047942 B3 describes an apparatus having a horizontal cylindrical reactor housing and a process for the batchwise polycondensation of polymers.

In a preferred embodiment of the invention, the apparatus for synthesis of a polymer with separation of a gaseous substance comprises a reaction space comprising an essentially circular cylindrical upper section which is bounded by two circular faces of a shell face and has a longitudinal cylinder axis, and a lower section, with the upper section bounded by a liquid level of a liquid phase of an oligomer melt disposed in the lower section, an inlet orifice disposed in a circular face or the shell face of the upper section, a first outlet orifice disposed in a wall of the lower section, a second outlet orifice disposed in the shell face of the upper section opposite the first outlet orifice, and a removal device which is disposed so as to be rotatable about the longitudinal cylinder axis and is in contact with both circular faces and the shell face.

SUMMARY OF THE INVENTION

The invention firstly provides an apparatus for synthesis of a polymer with separation of a gaseous substance comprising a reaction space comprising an essentially circular cylindrical upper section which is bounded by two circular faces and one shell face and has a longitudinal cylinder axis, and a lower section, an inlet orifice disposed in a circular face or the shell face of the upper section, a first outlet orifice disposed in a wall of the lower section, a second outlet orifice disposed in the shell face of the upper section essentially opposite the first outlet orifice, and a removal device which is disposed so as to be rotatable about the longitudinal cylinder axis and is in contact with both circular faces and the shell face.

The invention further provides a process for synthesizing a polymer, in which a prepolymer melt is fed into a reaction space through an inlet orifice, a polymerization of the prepolymer melt is performed to give a polymer melt, the polymer melt is removed from the reaction space through a first outlet orifice in the reaction space and the gaseous substance is removed from the reaction space through a second outlet orifice in the reaction space, deposits on at least one inner wall of the reaction space are removed by a removal device and transported into the prepolymer melt. The process according to the invention is especially suitable for a continuous polymer synthesis. It is preferable that the removal device removes the deposits continuously and thus keeps the inner wall of the reaction space free of deposits.

A specific embodiment is a process for synthesizing an aliphatic or semiaromatic polyamide, in which a prepolymer of the aliphatic or semiaromatic polyamide is provided and supplied to the apparatus used in accordance with the invention.

DESCRIPTION OF THE INVENTION

A prepolymer in the context of the invention refers to a composition comprising polymeric compounds having complementary functional groups capable of a condensation reaction to increase the molecular weight.

The term "prepolymer melt" in the context of the present invention refers to a free-flowing composition of the respective reaction mixture comprising the prepolymers. In this context, the temperature of the prepolymer melt need not necessarily be above the melting temperature of the pure prepolymer. The flowability may also result from the presence of other components of the prepolymer melt, for example water, low molecular weight oligomers, etc. In a specific embodiment, the prepolymer itself is present in molten form in the prepolymer melt.

The figures for the number-average molecular weight $M_n$ and for the weight-average molecular weight $M_w$ in the context of this invention are each based on a determination by means of gel permeation chromatography (GPC). For calibration, PMMA was used as a polymer standard with low polydispersity.

Through the inlet orifice of the inventive apparatus, a prepolymer melt can be introduced into the reaction space. After polymerization to give a polymer, the obtaining polymer melt can be removed from the reaction space through the first outlet orifice. The gaseous substance can be separated off through the second outlet orifice. The removal device enables removal of deposits on the inner walls of the reaction space above the melt through rotation about the longitudinal cylinder axis. By changing the dimensions of the reaction space, the capacity thereof can be varied. In a continuous polymer synthesis, this also alters the residence time of the melt in the reaction space.

In the context of the present invention, "is in contact with" is understood to include a non-constant contact. More particularly, a non-constant contact with the two circular faces and/or the shell face of the inventive apparatus is understood such that a thin film can form on the circular faces and/or the shell face of the reaction space.

A cross section of the lower section preferably decreases from the upper section to the first outlet orifice. More preferably, the cross section of the reaction space which encloses at least one circular face of the upper section is essentially droplet-shaped. This provides a large free volume in the first section of the reaction space, while the effect of the constriction of the reaction space in the lower section is that a melt present in the reaction space moves more quickly toward the first outlet orifice with falling distance from the first outlet orifice. In the case of continuous polymerization, this allows a polymer melt which collects in the lower region of the reaction space, in spite of its higher viscosity compared to the prepolymer melt introduced, to be removed reliably from the reaction space. The inlet orifice may in principle be disposed at any position in the upper section of the reaction space and, in the course of performance of a polymerization reaction, be above or within the liquid phase. It is preferable, however, that the inlet orifice is disposed in the shell face of the upper section such that the removal device can be utilized not only for removal of deposits but also for stripping off a prepolymer melt which has been introduced through the inlet orifice.

The removal device advantageously takes the form of a rotor with several rotor blades. In one embodiment of the invention, these rotor blades have orifices. The rotor blades are preferably exchangeable. Depending on the viscosity of the prepolymer melt used, the rotor can then be provided with rotor blades optimized to the viscosity. For example, for polymerization of a high-viscosity prepolymer melt, the rotor can be provided with rotor blades whose surface is occupied predominantly by orifices.

It is preferable in accordance with the invention that the reaction space is jacketed. This is advantageous in view of the high temperatures needed to keep oligomers or polymers in the melt, for ensuring good heat insulation of the reaction space, and also in order to prevent escape of the hot melt in the event of damage to the reaction space.

The invention further provides a process for synthesizing a polymer, comprising
a) feeding a prepolymer melt into a reaction space through an inlet orifice,
b) polymerizing the prepolymer melt to give a polymer melt,
c) removing the polymer melt from the reaction space through a first outlet orifice in the reaction space, and
d) removing a gaseous substance from the reaction space through a second outlet orifice in the reaction space,
wherein deposits on at least one inner wall of the reaction space are removed by a removal device and transported into the prepolymer melt.

Preferably, the removal device is immersed into the prepolymer melt. In this way, the removal device is constantly cleaned by the prepolymer melt to remove the deposits stripped off, and these are converted to the liquid phase at the temperature of the melt.

If the inlet orifice is disposed in a shell face of a cylindrical first section of the reaction space, it is preferable that the removal device is rotated about the longitudinal cylinder axis of the first section in the direction in which the prepolymer melt runs out of the inlet orifice into the reaction space. This allows the removal device to be utilized not only for removal of deposits but additionally accelerates the transport of the prepolymer melt into the reaction space.

It is additionally preferable that the speed with which the polymer melt moves toward the second outlet orifice increases with falling distance from the first outlet orifice. This enables reliable removal of the polymer melt from the reaction space.

In principle, the process according to the invention can be performed with any polymer which can be converted to a melt. The polymer is preferably selected from thermoplastic polymers. The polymer is more preferably selected from polyamides, thermoplastic polyurethanes, polyolefins, vinylaromatic polymers, polyesters, polyacetals, polycarbonates, polysulfones, polyether sulfones and mixtures thereof.

Preferably, the polymer is a polyamide and the gaseous substance is steam. A specific embodiment of the process according to the invention is therefore a process for synthesizing an aliphatic or semiaromatic polyamide, in which, in step a), a prepolymer of the aliphatic or semiaromatic polyamide is provided and supplied to the apparatus used in accordance with the invention.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used:
T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl (1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

The polyamide prepolymer is provided by polycondensation of an aqueous composition comprising at least one component suitable for polyamide formation.

Preferably, the prepolymer (and accordingly the aliphatic or semiaromatic polyamide) comprises incorporated components selected from A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids and derivatives thereof,
D) aliphatic or cycloaliphatic diamines,
E) monocarboxylic acids and derivatives thereof,
F) monoamines,
G) at least trifunctional amines,
H) lactams,
I) ω-amino acids,
K) compounds which are different than A) to I) and are cocondensable therewith.

A suitable embodiment is aliphatic polyamides. For aliphatic polyamides of the PA Z1 Z2 type (such as PA 66), the proviso applies that at least one of components C) and D) must be present and neither of components A) and B) may be present. For aliphatic polyamides of the PAZ type (such as PA 6 or PA 12), the proviso applies that at least component H) must be present.

A preferred embodiment is semiaromatic polyamides. For semiaromatic polyamides, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have one or two $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamide prepolymers provided in accordance with the invention have a proportion of aromatic dicarboxylic acids among all the dicarboxylic acids of at least 50 mol %, more preferably of 70 mol % to 100 mol %. In a specific embodiment, the semiaromatic polyamides prepared by the process according to the invention (and the prepolymers provided in step a)) have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α, ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific implementation, the semiaromatic polyamides comprise at least one copolymerized diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific implementation, the semiaromatic polyamides comprise exclusively hexamethylenediamine as the copolymerized diamine D).

In a further specific implementation, the semiaromatic polyamides comprise exclusively bis(4-aminocyclohexyl)methane as the copolymerized diamine D).

In a further specific implementation, the semiaromatic polyamides comprise exclusively 3,3'-dimethyl-4,4'-diaminocyclohexylmethane (MACM) as the copolymerized diamine D).

In a further specific implementation, the semiaromatic polyamides comprise exclusively isophoronediamine (IPDA) as the copolymerized diamine D).

The prepolymers (and correspondingly the aliphatic and semiaromatic polyamides) may comprise at least one copolymerized monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

In a specific implementation, the prepolymers (and correspondingly the aliphatic and the semiaromatic polyamides) comprise exclusively propionic acid as the copolymerized monocarboxylic acid E).

In a further specific implementation, the prepolymers (and correspondingly the aliphatic and the semiaromatic polyamides) comprise exclusively benzoic acid as the copolymerized monocarboxylic acid E).

In a further specific implementation, the prepolymers (and correspondingly the aliphatic and the semiaromatic polyamides) comprise exclusively acetic acid as the copolymerized monocarboxylic acid E).

The prepolymers (and correspondingly the aliphatic and the semiaromatic polyamides) may comprise at least one copolymerized monoamine F). In this case, the aliphatic polyamides comprise only copolymerized aliphatic monoamines or alicyclic monoamines. The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

For preparation of the prepolymers (and correspondingly of the aliphatic and the semiaromatic polyamides), it is additionally possible to use at least one trifunctional amine G). These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a preferred embodiment, the process according to the invention serves for preparation of an aliphatic polyamide.

In that case, the polyamide is preferably selected from PA 6, PA 11, PA 12, PA 46, PA 66, PA 666, PA 69, PA 610, PA 612, PA 96, PA 99, PA 910, PA 912, PA 1212, and copolymers and mixtures thereof.

More particularly, the aliphatic polyamide is PA 6, PA 66 or PA 666, most preferably PA 6.

In a further preferred embodiment, the process according to the invention serves for preparation of a semiaromatic polyamide.

In that case, the polyamide is preferably selected from PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.1, PA 10.T/6.T, PA 10.T/6.6, PA 10.T/10.I, PA 10T/10.1/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In that case, the polyamide is more preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In a specific implementation, the semiaromatic polyamide is PA 6.T/6.I.

In a further specific implementation, the semiaromatic polyamide is PA 6.T/6.I/IPDA.T/IPDA.I.

In a further specific implementation, the semiaromatic polyamide is PA 6.T/6.I/MXDA.T/MXDA.I.

For preparation of the prepolymers provided in accordance with the invention, an aqueous composition comprising at least one component suitable for polyamide formation is generally used. The prepolymers can in principle be prepared by customary processes known to those skilled in the art. A suitable process for preparing semiaromatic polyamide oligomers is described, for example, in EP 0 693 515 A1.

The prepolymers (especially the polyamide prepolymers) provided for use in the process according to the invention preferably have a number-average molecular weight $M_n$ of about 500 to about 12 000 g/mol, preferably of about 1000 to 4000 g/mol.

The prepolymer melt used in the process according to the invention and, accordingly, the polymer obtained can in principle be prepared by customary processes known to those skilled in the art. A suitable process for preparing prepolymers comprising at least one incorporated repeat unit having an aromatic group and at least one incorporated repeat unit having an aliphatic or cycloaliphatic group is described in EP 0 693 515 A1, which is fully incorporated by reference.

Even though it is possible in principle to perform the process according to the invention in any apparatus suitable for this purpose, it is preferable to perform it in an apparatus according to the present invention.

If the process according to the invention is used to prepare aliphatic polyamides, they preferably have a number-average molecular weight $M_n$ within a range from 13 000 to 28 000 g/mol.

If the process according to the invention is used to prepare semiaromatic polyamides, they preferably have a number-average molecular weight $M_n$ within a range from 13 000 to 25 000 g/mol, more preferably of 15 000 to 20 000 g/mol.

The aliphatic polyamides obtained by the process according to the invention preferably have a weight-average molecular weight $M_w$ within a range from 20 000 to 140 000 g/mol.

The semiaromatic polyamides obtained by the process according to the invention preferably have a weight-average molecular weight $M_w$ within a range from 25 000 to 125 000 g/mol.

The aliphatic and semiaromatic polyamides obtained by the process according to the invention preferably have a polydispersity PD ($=M_w/M_n$) not exceeding 6, more preferably not exceeding 5, especially not exceeding 3.5.

DESCRIPTION OF FIGURES AND EXAMPLES

The invention will now be illustrated by a working example with reference to the drawings.

Figure 1:
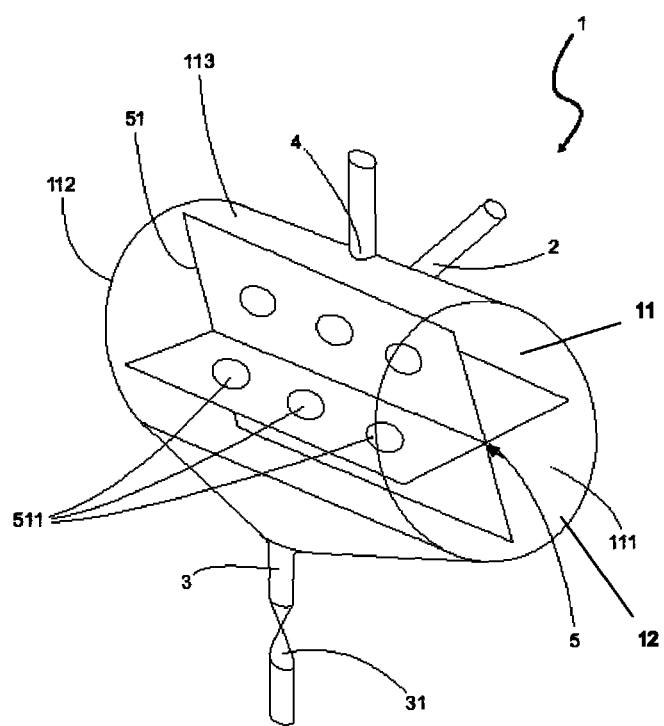
FIG. 1 shows a perspective view of an apparatus in one embodiment of the invention.
Figure 2:
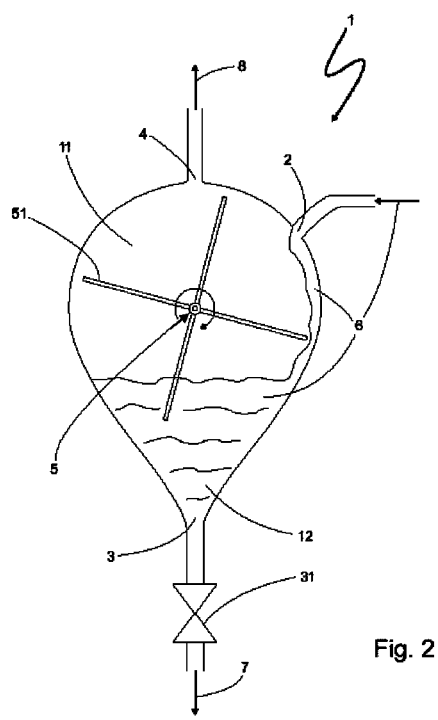
FIG. 2 shows a section through an inventive apparatus, in which a process in one embodiment of the invention is performed.

FIGS. 1 and 2 show a working example of the inventive apparatus for synthesis of a polymer, comprising a jacketed reaction space 1. This consists of an upper section 11 and a lower section 12. The upper section is essentially circular cylindrical and has two circular faces 111, 112 and one shell face 113. The shell face 113 does not fully enclose the upper section 11, but rather merges into the wall of the lower section 12. The lower section 12 takes such a form that the cross section of the reaction space 1 shown in FIG. 2 is essentially droplet-shaped. An inlet orifice 2 is in the upper half of the shell face 113 of the upper section 11. A first outlet orifice 3 is disposed at the lowest point in the lower section 12, in the wall thereof, and is connected to an outlet valve 31. A second outlet orifice 4 is essentially opposite the first outlet orifice 3 in the shell face 113 of the upper section 11. A removal device 5 takes the form of a rotor which is disposed so as to be rotatable about the longitudinal cylinder axis of the upper section 11. This has four rotor blades 51. Each rotor blade 51 is in contact with both circular faces 111, 112 and the shell face 113. The rotor blades 51 are exchangeable. In the embodiment of the invention shown in FIG. 1, the rotor blades 51 have orifices 511 which are particularly suitable for use in the case of polymerization of high-viscosity prepolymer melts.

In one embodiment of the process according to the invention, the apparatus in the above-described embodiment of the invention is used to synthesize the polymer therein (specifically a PA 6T/6I polyamide). In this case, a prepolymer melt 6 is fed continuously to the reaction space 1 through the inlet orifice 2 and collects in a lower part of the upper section 11 and in the lower section 12 of the reaction space 1. In the reaction space 1, the prepolymer melt 6 is polymerized to give a polymer melt 7. Because of its higher density compared to the prepolymer melt, the polymer melt 7 falls to the bottom of the reaction space 1. It is removed there from the reaction space through the first outlet orifice 3 and the outlet valve 31. "Polymer melt 7" is understood here to mean a melt which is at reaction equilibrium and may quite possibly still comprise oligomers and water. Water evaporates during the process according to the invention and is removed from the reaction space 1 as a gaseous substance 8 through the second outlet orifice 4. As a result of evaporation and/or upward spraying of monomers or short-chain oligomers present in the prepolymer melt 6, which polymerize above the liquid phase on the inner wall of the upper section 11 of the reaction space 1 to give longer-chain oligomers or polymer, deposits form on this inner wall. The removal device 5 is therefore rotated continuously, in order to scrape these deposits off the inner wall of the reaction space 1 and transport them into the prepolymer melt 6. Because of the high temperatures which prevail therein, they become detached from rotor blades 51 of the removal device 5 and are taken up by the prepolymer melt 6. By virtue of the removal device 5 rotating in the same direction in which the prepolymer melt 6 flows through the inlet orifice 2 into the reaction space 1, i.e. clockwise in FIG. 2, the rotor blades 51 additionally accelerate the transport of the prepolymer melt 6 into the reaction space 1.

By virtue of this embodiment of the process according to the invention preventing the formation of deposits in the reaction space 1, or removing deposits already formed, a continuous process regime is possible over a long period without any need to stop the process for manual removal of the deposits.

LIST OF REFERENCE NUMERALS

1 reaction space
2 inlet orifice
3 first outlet orifice
4 second outlet orifice
5 removal device
6 prepolymer melt
7 polymer melt
8 gaseous substance
11 upper section
12 lower section
31 outlet valve
51 rotor blade
111 circular face
112 circular face
113 shell face
511 orifice(s)

The invention claimed is:

1. A process for synthesizing a polymer by polymerizing a prepolymer melt (6) to give a polymer melt (7) with separation of a gaseous substance (8) in an apparatus comprising
a reaction space (1) comprising an essentially circular cylindrical upper section (11) which is bounded by two circular faces (111, 112) and one shell face (113) and has a longitudinal cylinder axis, and a lower section (12),
an inlet orifice (2) disposed in a circular face (111, 112) or the shell face (113) of the upper section (11),
a first outlet orifice (3) disposed in a wall of the lower section (12),
a second outlet orifice (4) disposed in the shell face (113) of the upper section (11) opposite the first outlet orifice (3) and
a removal device (5) which is disposed so as to be rotatable about the longitudinal cylinder axis and is in contact with both circular faces (111, 112) and the shell face (113), the removal device (5) taking the form of a rotor with several rotor blades (51), and which is immersed into the prepolymer melt (6), and wherein the cross section of the reaction space (1) which encloses at least one circular face (111, 112) of the upper section (11) is essentially droplet-shaped,
having the following process steps:
a) feeding a prepolymer melt (6) into a reaction space (1) through an inlet orifice (2),
b) polymerizing the prepolymer melt (6) to give a polymer melt (7),
c) removing the polymer melt (7) from the reaction space (1) through a first outlet orifice (3) in the reaction space (1), and
d) removing a gaseous substance (8) from the reaction space (1) through a second outlet orifice (4) in the reaction space (1),
wherein deposits on at least one inner wall of the reaction space (1) are removed by a removal device (5) immersed into the prepolymer melt (6), and transported into the prepolymer melt (6).

2. The process according to claim 1, wherein
the inlet orifice (2) is disposed in a shell face (113) of a cylindrical first section (11) of the reaction space (1),
the removal device (5) is rotated about the longitudinal cylinder axis of the first section (11) in the direction in which the prepolymer melt (6) runs out of the inlet orifice (2) into the reaction space (1).

3. The process according to claim 1, wherein the speed with which the polymer melt (7) moves toward the first outlet orifice (3) increases with falling distance from the first outlet orifice (3).

4. The process according to claim 1, wherein the polymer comprises a thermoplastic polymer.

5. The process according to claim 1, wherein the polymer is a polyamide and the gaseous substance is steam.

6. The process according to claim 1, wherein the polymer is a semiaromatic polyamide comprising at least one incorporated repeat unit having an aromatic group and at least one incorporated repeat unit having an aliphatic or cycloaliphatic group.

7. The process according to claim 1, wherein the polymer is a polyamide selected from the group consisting of
PA 6.T, PA 9.T, PA8.T, PA 10.T, PA 12.T, PA 6.1, PA 8.1, PA 9.1, PA 10.1, PA 12.1, PA 6.T/6, PA 6.T/10, PA 6.T/12, PA 6.T/6.1, PA6.T/8.T, PA 6.T/9.T, PA 6.T/10T, PA 6.T/12.T, PA 12.T/6.T, PA 6.T/6.1/6, PA 6.T/6.1/12, PA 6.T/6.1/6.10, PA 6.T/6.1/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.1, PA 10T/10.1/6.T, PA 10.T/6.1, PA 4.T/4.1/46, PA 4.T/4.1/6.6, PA 5.T/5.I, PA 5.T/5.1/5.6, PA 5.T/5.1/6.6, PA 6.T/6.1/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.1/8.T/8.I, PA 6.T/6.1/10.T/10.1, PA 6.T/6.I/IPDA.T/IPDA.I, PA 6.T/6.1/MXDA.T/MXDA.I, PA 6.T/6.I/MACM.T/MACM.I, PA 6.T/6.1/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T, and copolymers and mixtures thereof.

8. The process according to claim 4, wherein the polymer is selected from the group consisting of polyamides, thermoplastic polyurethanes, polyolefins, vinylaromatic polymers, polyesters, polyacetals, polycarbonates, polysulfones, polyether sulfones, and mixtures thereof polymer.

* * * * *